United States Patent [19]
Messner et al.

[11] Patent Number: 5,928,511
[45] Date of Patent: *Jul. 27, 1999

[54] OIL FILTER WITH HOUSING DRAIN CHANNEL

[75] Inventors: Karl-Heinz Messner, Benningen; Herbert Jainek, Heilbronn, both of Germany

[73] Assignee: Filterwerk Mann & Hummel GmbH, Ludwigsburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/788,290

[22] Filed: Jan. 24, 1997

[30] Foreign Application Priority Data

Jan. 27, 1996 [DE] Germany .............................. 196 02 497

[51] Int. Cl.$^6$ ................................................. B01D 35/34
[52] U.S. Cl. .......................... 210/248; 210/428; 210/436; 210/440; 210/441
[58] Field of Search ...................................... 210/130, 248, 210/428, 440, 441, 433.1, 436, 443

[56] References Cited

U.S. PATENT DOCUMENTS

| | | | |
|---|---|---|---|
| 1,720,475 | 7/1929 | Hewitt ...................................... | 210/130 |
| 4,094,791 | 6/1978 | Conrad ..................................... | 210/248 |
| 4,863,599 | 9/1989 | Guenther et al. ........................ | 210/248 |
| 5,098,559 | 3/1992 | Mack et al. .............................. | 210/248 |
| 5,520,801 | 5/1996 | Gerber et al. ............................ | 210/130 |
| 5,698,098 | 12/1997 | Ernst et al. .............................. | 210/248 |

*Primary Examiner*—Matthew O. Savage
*Attorney, Agent, or Firm*—Evenson, McKeown, Edwards & Lenahan, P.L.L.C.

[57] ABSTRACT

An oil filter including a filter housing, a cover and a filter element arranged within the filter housing and provided with an outlet channel which is closed by a seal when the cover is in a closed position and which allows oil situated in the filter housing to run out into a collecting tank when the cover is opened.

6 Claims, 3 Drawing Sheets

OIL FILTER WITH HOUSING DRAIN CHANNEL

BACKGROUND OF THE INVENTION

This invention relates to an oil filter comprising a filter housing, a removable cover and a filter element which is arranged in the filter housing.

German Utility Model No. DE-GM 94 11 212.6 discloses a liquid filter, particularly for use as an oil filter for combustion engines. The disclosed liquid filter comprises a filter housing with, in each case, at least one liquid inlet channel and one liquid outlet channel, additionally, a detachable cover which closes the filter housing in a liquid-tight manner as well as a filter insert that can be removed from the filter housing and can be exchanged separately. Unlike a screw-on replacement filter which may only be replaced in its entirety, this liquid filter is screwed together with the combustion engine via a connecting flange. Screw-on replacement filters have been known for many years and have come into widespread use, primarily with internal combustion engines of motor vehicles. Every time such a screw-on replacement filter has to be replaced, it can only be disposed of and recycled in its entirety, thus resulting in considerable material costs. With the filter arrangement disclosed in the aforementioned German Utility Model, the material costs may be reduced by merely exchanging the filter insert and by re-using the remaining components of the liquid filter. One drawback of this known filter arrangement is that, when the filter insert is unscrewed, the oil inside the filter housing flows out and dirties the filter housing and the cover, as well as further structural parts situated in the engine compartment. For that reason, the German Utility Model proposes to arrange a discharge screw at the lowest point of the filter housing. When the filter insert is replaced, the discharge screw is first opened so that oil situated in the housing can flow out. Then the cover can be opened, and afterwards it is possible to remove the filter element. This handling, however, is extremely impractical. In addition, there is a danger that leakage problems may occur in the vicinity of the discharge screw, thus resulting in a loss of oil.

SUMMARY OF THE INVENTION

It is an object of the invention to provide a filter assembly which avoids the aforementioned drawbacks.

Another object of the invention is to provide a filter assembly which is assembled in a simple manner.

A further object of the invention is to provide an oil filter assembly which allows the filter element to be replaced without any uncontrolled discharge of oil.

These and other objects have been achieved in accordance with the present invention by providing an oil filter comprising a filter housing, an openable cover for the housing, and a filter element arranged in the filter housing, wherein the housing is provided with an outlet channel which is shut by a seal when the cover is closed and which is opened to allow oil from inside the filter housing to flow out for controlled collection when the cover is opened.

It is already known from published European Patent Application No. EP 314,915 to arrange a valve within a filter housing which opens an outlet channel for oil situated in the housing when the housing cover is opened. For this purpose, however, it is on the one hand required that the filter housing have an approximately perpendicular position in order to enable a run-off. On the other hand, it is necessary to arrange an additional valve within the filter housing, thereby increasing the production costs of the oil filter.

An important advantage of the invention is that, when opening the cover of the filter housing, the oil can flow out of the housing without the need to adjust or actuate any further mechanical components.

Another important advantage of the invention is that when the cover is opened, a defined airstream can simultaneously be admitted into the housing, so that it is then possible for the oil to run off rapidly.

According to one embodiment of the invention, the cover of the filter housing is provided with a supporting tube. The function of the supporting tube is to compensate for any pressure differential between the unfiltered-oil side and the filtered-oil side which acts on the filter element and, furthermore, to protect the filter element from deformation. If desired, the filter assembly may be provided with a pressure relief valve between the unfiltered liquid area and the filtered liquid area to facilitate continued flow if the filter should become clogged. On the supporting tube, an actuating element or a lug is provided which is operatively connected with a valve. When the cover is screwed on, the valve closes the outlet channel, thereby preventing the oil from flowing out. As soon as the cover is opened or unscrewed, the lug of the supporting tube is shifted axially to release the valve. Consequently, the outlet channel 18 also is opened, and the oil situated in the filter housing can flow out without any hindrance.

One advantage of such a valve, which is actuated in conjunction with a central support tube, is that the valve actuating positions can be defined very precisely. In contrast, valves that are actuated merely on the basis of the position of the filter element frequently exhibit inaccurate and variable actuation positions because of the high dimensional tolerances of such filter elements.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
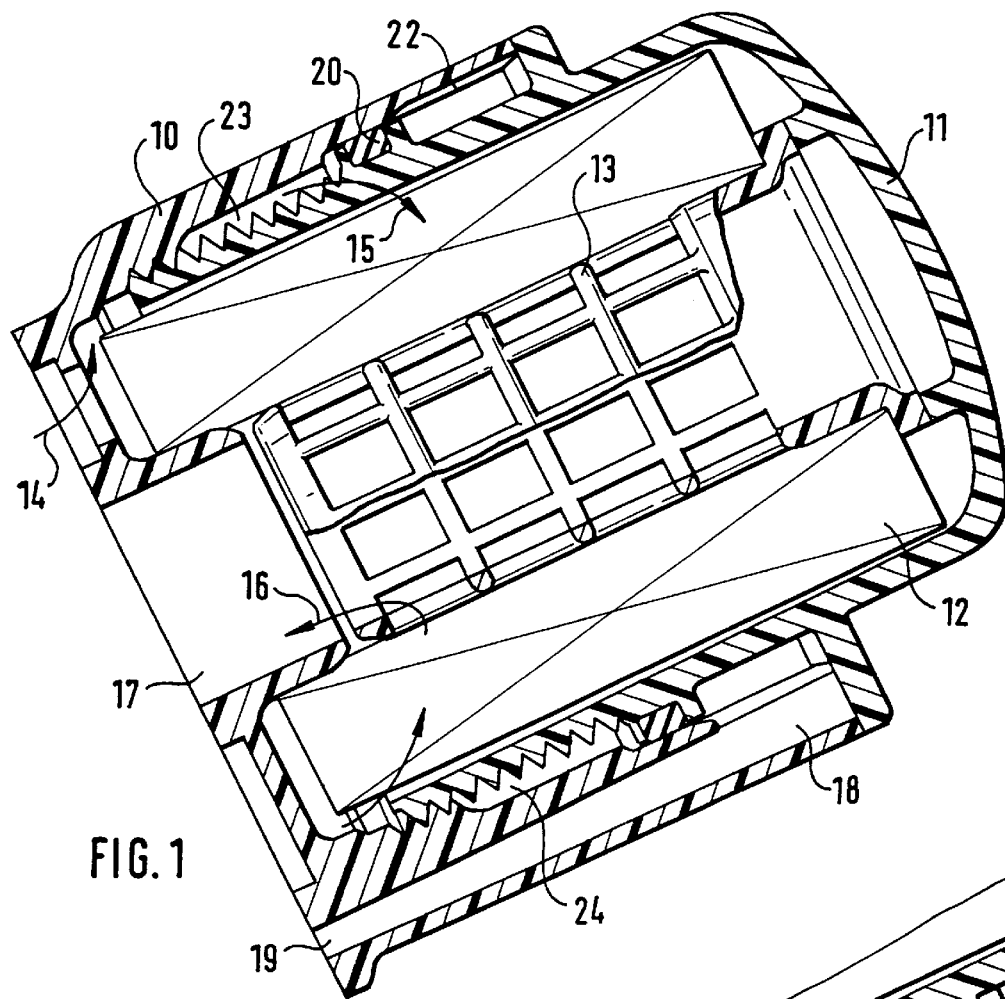
FIG. 1 is a sectional view of an oil filter according to the invention with the outlet channel closed.

As illustrated in FIG. 1, the invention relates to an oil filter assembly which comprises a filter housing 10 and a cover 11, as well as an exchangeable filter element 12. The filter element 12 is pushed onto a supporting tube 13 which is attached to the cover 11. The cover 11 is provided with threads which engage mating threads on the filter housing 10 so that the cover can be opened by unscrewing it from the housing. The liquid, for example motor oil, to be cleaned by filtration initially enters the filter housing 10 as shown by the arrow 14. The liquid then is guided as indicated by arrow 15 through an unfiltered oil area to the exterior of the filter element 12 and passes through the filter element into a filtered oil area in the interior of the support tube 13. From thence the filtered or cleaned liquid passes as indicated by the arrow 16 through the central outlet opening 17.

Figure 1A:
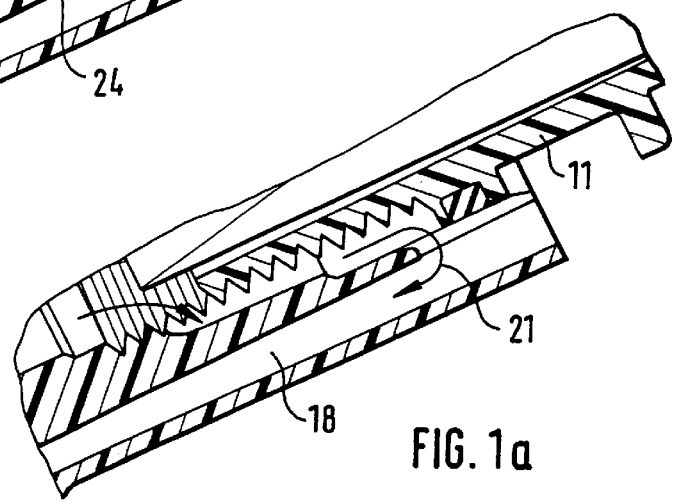
FIG. 1a is a sectional fragmentary view of the filter of FIG. 1 with the outlet channel open.

In order to exchange the filter element 12, the cover 11 is opened by unscrewing it; the filter element is removed, and a new filter element is placed on support tube 13 and inserted into the filter housing 10. So that oil in the filter housing does not flow out onto the exterior of the filter housing when the cover is removed, an outlet channel 18 is arranged at the bottom of the filter assembly. The outlet opening 19 of outlet channel 18 is directed toward an oil tank or oil sump, not shown in the drawing. As can be seen in FIG. 1a, when the cover 11 is partially unscrewed, it is displaced axially so that seal 20 opens a path through a groove in the threaded sidewall of the housing to outlet channel 18 so that oil can flow out as indicated by arrow 21. At the same time, air can flow through the slot openings 22, 23 into the top region of the filter housing 10 so that a rapid discharge of the oil is ensured. After the oil has flowed out of the filter housing 10, the cover 11 can be removed completely and the housing opened so that the exchangeable filter element 12 can be removed from the supporting tube 13.

Figure 2:
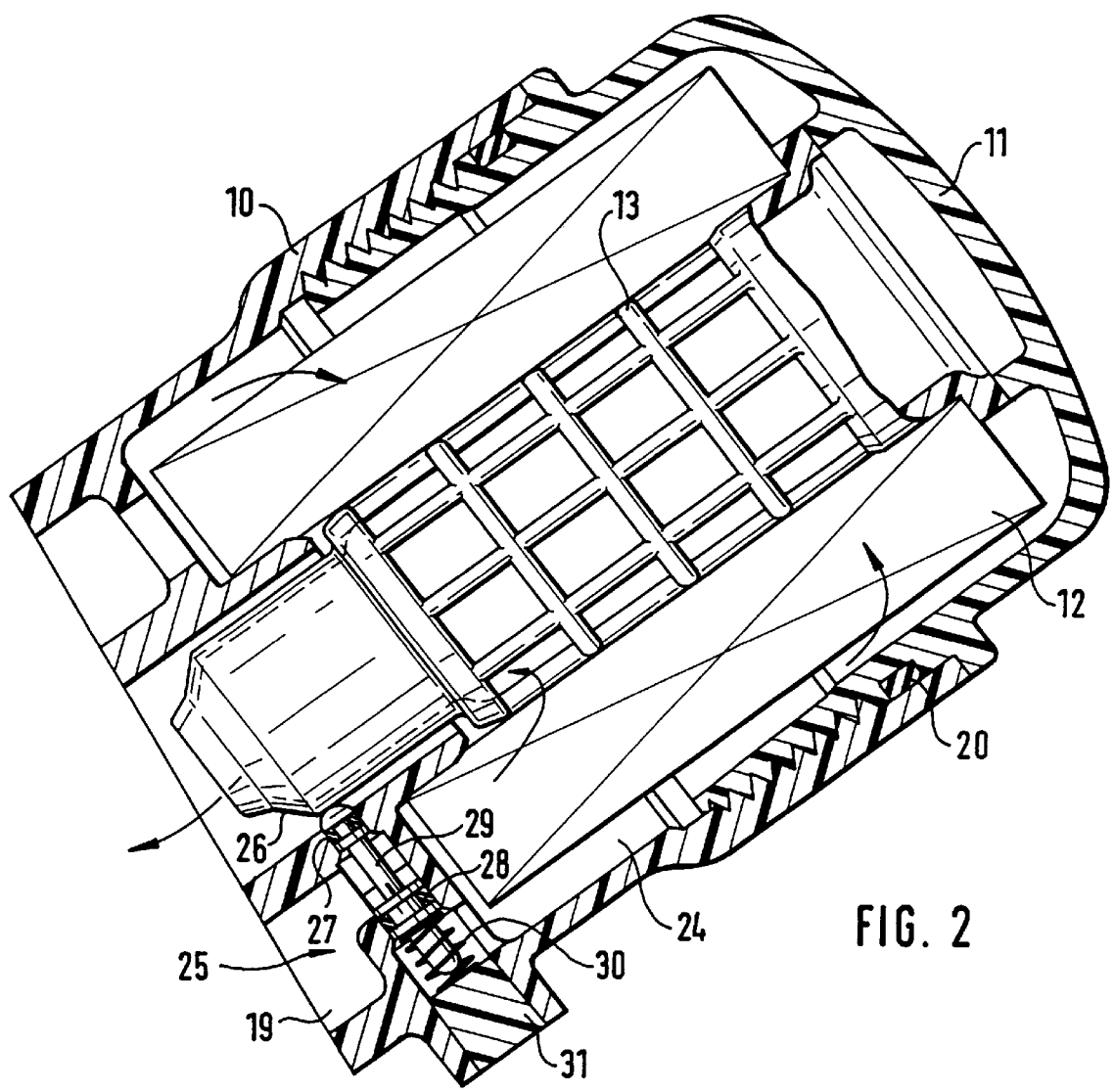
FIG. 2 is a sectional view of an alternate oil filter embodiment according to the invention with an outlet valve in closed position.
Figure 2A:
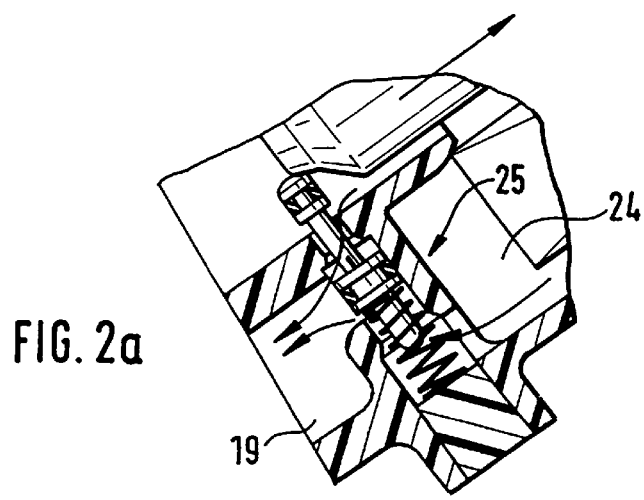
FIG. 2a is a fragmentary detail view of a portion of the valve of FIG. 2 showing the valve in open position.

FIGS. 2 and 2a show a variant embodiment of the oil filter according to the invention in which like parts are identified by like reference numerals. In contrast to the embodiment illustrated in FIGS. 1 and 1a, in this embodiment a valve 25 is arranged between the unfiltered liquid area 24 and the outlet channel opening 19. The valve 25 is constructed in a simple manner and comprises two seal rings 27, 28 mounted on a valve shaft 29. Other types of valves could also be used. Due to contact of the valve shaft 29 with a lug 26 disposed at the lower end of the supporting tube 13, the valve 25 is held in a closed position when the cover is screwed on, so that it is not possible for oil to flow out through the outlet channel opening 19. A compression spring 30, which rests against a closure element 31, urges the valve shaft 29 radially inwardly against the lug 26. As the cover 11 is unscrewed, it is displaced along an axial path and lug 26 is pulled back from the valve shaft, so that spring 30 can open the valve 25 which moves into the position shown in the FIG. 2a. Consequently, the connection is opened between the unfiltered-liquid area 24 as well as the clean-liquid area and the outlet channel 19, so that the oil can flow out. When the cover including the supporting tube 13 is screwed on again, the valve 25 closes the opening so that oil pressure can build up inside the filter housing 10.

Figure 3:
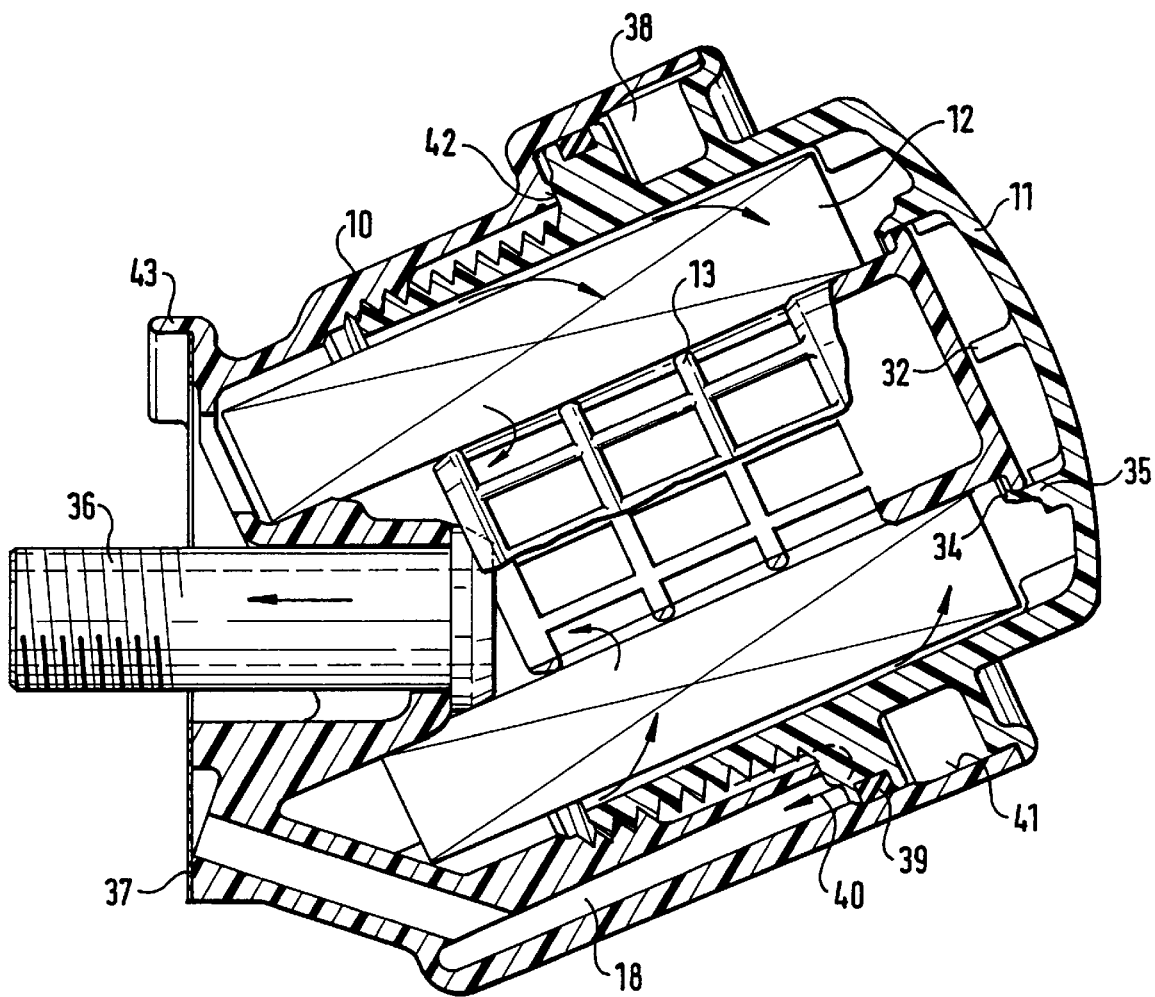
FIG. 3 is a sectional view of a further oil filter embodiment according to the invention.

FIG. 3 illustrates a further variation of an oil filter according to the invention, comprising a filter housing 10 in which an exchangeable annular filter element 12 is arranged. The filter housing 10 is closed by a threaded cover 11. A supporting tube 13 is mounted or snapped onto the cover 11. Proper positioning of the supporting tube 13 during attachment thereof to the cover is facilitated by means of a centrally located centering pin 32 which is received in a centering bore on the support tube. Instead of attaching the supporting tube with a snap-in mounting, it is also possible to fasten the supporting tube to the cover by caulking, adhering or welding. In case of caulking the supporting tube, the exterior element 34 of the flange 35 is bent to the inside, after having fixed the supporting tube.

The filter housing 10 is screwed by means of a central fastening bolt 36 to a contact surface of a device (not shown) to which the filter unit is attached. In order to facilitate sealing, it is possible to provide corresponding seal rings between the contact surface and the filter housing 10. It is likewise possible to arrange an elastomer-coated metal sheet 37 adjacent the contact surface or to provide the filter housing with a suitable elastomer coating in the vicinity of the contact surface. The fastening bolt 36 is appropriately secured in the usual manner against becoming loose.

The arrangement for discharging oil situated in the filter housing when the cover is opened, comprises an outlet channel 18 and a vent chamber 38. The outlet channel 18 is sealed with respect to the exterior of the filter via a seal 39. As soon as the cover is opened, it is possible for the oil to flow into the outlet channel 18 as indicated by the arrow 40. Since the seal 39 initially remains in contact with the surface 41 when the cover 11 is unscrewed, the seal 39 prevents oil from exiting around the external wall of the filter housing 10. The end stop surface 42 of the cover 11 ensures a mechanical end stop and, additionally, has a sealing effect within the system. The sealing with respect to the outside is effected by means of seal 39.

In order to install the oil filter in the correct position at the contact surface, a snap-action lug 43 is provided. This snap-action lug 43 engages a mating bore or recess situated at the contact surface, thus ensuring that the outlet channel 18 is always located at the lowest point of the oil filter.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil filter comprising:
   a filter housing having a peripheral wall surrounding a central axis, an open end, and a closed end, wherein the peripheral wall includes an inner peripheral surface, said inner peripheral surface including a first portion adjacent said open end and a second threaded portion adjacent said closed end, wherein said second threaded portion includes an axially extending slot formed therein, and an outlet channel extending axially through said peripheral wall from said first portion of the inner peripheral surface to said closed end for draining oil from said filter housing;
   an openable cover for the housing, said cover having exterior threads which engage threads on second threaded portion of the inner peripheral surface of the filter housing, and being openable by unscrewing it from the housing; and
   a filter element arranged in the filter housing;
   wherein said cover includes sealing means for fluidly separating said outlet channel at the first portion of said inner peripheral surface of the peripheral wall from said slot when the cover is closed and for providing fluid communication between said outlet channel at the first portion of said inner peripheral surface of the peripheral wall and said slot to allow oil from inside the filter housing to flow out of said housing via said slot and said outlet channel for controlled collection when the cover is opened.

2. An oil filter according to claim 1, wherein a support tube is mounted on the cover, and the filter element comprises an exchangeable annular filter element received on the support tube.

3. An oil filter according to claim 1, wherein the closed end of the housing comprises a contact surface for engaging a device to which the oil filter is to be attached, said oil filter further comprising an elastomer-coated metal sheet arranged at the contact surface to assure a tight seal between the housing and the device.

4. An oil filter according to claim 1, wherein the closed end of the housing comprises a contact surface for engaging a device to which the oil filter is to be attached, said housing further comprising a positioning lug at the contact surface for engaging a mating receptacle on the device to assure correct positioning of the oil filter with the outlet channel at the bottom thereof.

5. An oil filter according to claim 1, wherein the closed end of the housing comprises a contact surface for engaging a device to which the oil filter is to be attached, and the filter housing is provided with a bolt arranged centrally of the contact surface for fastening the housing to the device.

6. An oil filter comprising:

- a filter housing having a peripheral wall surrounding a central axis, an open end, and a closed end, wherein the peripheral wall includes an inner peripheral surface, said inner peripheral surface including a threaded portion adjacent said open end, and an outlet channel at said closed end for draining oil from said filter housing;
- an openable cover for the housing, said cover having exterior threads which engage threads on the threaded portion of the inner peripheral surface of the filter housing, and being openable by unscrewing it from the housing;
- a filter element arranged in the filter housing;
- wherein a support tube is mounted on the cover, and the filter element comprises an exchangeable annular filter element received on the support tube;
- a valve member positioned in said outlet channel having a longitudinal axis that is generally perpendicular to said central axis, said valve member including a free end for contact with a free end of the support tube and a spring for biasing the valve member in a direction toward said central axis;
- wherein a free end of the support tube biases said valve member in a direction generally away from said central axis to a closed position to close the outlet channel when the cover is closed, and wherein said spring biases the valve member in a direction generally toward said central axis to an open position thereby opening the outlet channel when the cover is opened.

* * * * *